(12) United States Patent
Salman

(10) Patent No.: US 6,457,895 B1
(45) Date of Patent: Oct. 1, 2002

(54) FLUSH MOUNT BREAKAWAY POST COUPLER

(76) Inventor: Mark T. Salman, 1710 Harrod La., Greensboro, NC (US) 27410

(*) Notice: Subject to any disclaimer, the term of this patent is extended or adjusted under 35 U.S.C. 154(b) by 25 days.

(21) Appl. No.: 09/610,325

(22) Filed: Jul. 5, 2000

(51) Int. Cl.⁷ .......................... F16D 9/00; F16M 13/00
(52) U.S. Cl. .................. 403/2; 403/374.1; 403/374.3; 52/98; 52/169.3; 256/1
(58) Field of Search ..................... 52/98, 99, 169.3; 256/1, 13.1; 403/2, 373, 374.1–374.4, 370

(56) References Cited

U.S. PATENT DOCUMENTS

| | | | |
|---|---|---|---|
| 1,365,496 A | * | 1/1921 | Weaver .................... 403/370 |
| 1,409,524 A | * | 3/1922 | Chase |
| 2,308,542 A | * | 1/1943 | Raybould |
| 2,349,933 A | * | 5/1944 | Barry |
| 2,840,402 A | * | 6/1958 | Hassel |
| 3,175,455 A | * | 3/1965 | Reddy |
| 3,274,744 A | * | 9/1966 | Blum et al. .................. 52/704 |
| 3,349,531 A | * | 10/1967 | Watson ..................... 403/2 |
| 3,381,427 A | * | 5/1968 | Watson ..................... 52/98 |
| 3,628,296 A | * | 12/1971 | Henry |
| 3,820,906 A | * | 6/1974 | Katt |
| 3,841,695 A | * | 10/1974 | Woodward |
| 3,846,030 A | | 11/1974 | Katt |
| 4,638,608 A | | 1/1987 | Coy |
| 4,850,565 A | | 7/1989 | Moreno |
| 4,926,592 A | | 5/1990 | Nehls |
| 5,004,366 A | * | 4/1991 | Simmons |
| 5,201,244 A | * | 4/1993 | Stewart et al. |
| 5,214,886 A | | 6/1993 | Hugron |
| 5,251,494 A | * | 10/1993 | Edwards |
| 5,424,593 A | * | 6/1995 | Buehler |
| 5,425,593 A | | 6/1995 | Buehler |
| 5,480,121 A | * | 1/1996 | Rice et al. |
| 5,535,555 A | | 7/1996 | Boyd et al. |
| 5,782,040 A | | 7/1998 | McCartan |
| 5,855,443 A | | 1/1999 | Faller et al. |
| 5,896,734 A | * | 4/1999 | Chesack et al. ............ 403/2 |
| 6,113,055 A | * | 9/2000 | Salman |
| 6,216,413 B1 | * | 4/2001 | Lapointe |

* cited by examiner

Primary Examiner—Lynne H. Browne
Assistant Examiner—Ernesto Garcia
(74) Attorney, Agent, or Firm—Richard C. Litman

(57) ABSTRACT

The flush mount breakaway post coupler is a coupler for connecting a post to a ground anchor. The coupler has an upper section and a lower section. The upper section has a socket for receiving a post, a shear section, and an anchor attachment portion for attachment to the lower section. The shear section is hollow and cylindrical and has an groove defined about its exterior so that the wall of the shear section is thin, fracture of the coupler occurring around the annular groove. The lower section is an expansion anchor having a threaded bore for receiving a bolt, the lower section being placed in a tubular ground anchor, or a hole defined in the ground. The socket has a bottom wall, and a cylindrical bore extends through the shear section to a predetermined base in the anchor attachment portion. A bolt hole extends from the base of the bore through the anchor attachment section. A bolt connects the upper and lower sections so that the coupler is wedged into the tubular ground anchor as the bolt is tightened. The coupler is installed with the shear section coplanar with ground level. When the coupler fractures, the socket breaks off, leaving no portion of the coupler above ground, and the remaining annular edge of the shear section and the top surface of the bolt head level with the surface of the ground.

12 Claims, 5 Drawing Sheets

FLUSH MOUNT BREAKAWAY POST COUPLER

BACKGROUND OF THE INVENTION

1. Field of the Invention

The present invention relates to a post coupler, and particularly to a flush mount breakaway post coupler for coupling parking meter posts, sign posts, fence posts and the like to an anchor mounted in the ground so that when the post is subjected to an impact above a threshold limit, the post coupler breaks flush with the ground leaving only a narrow annular hole exposed.

2. Description of the Related Art

Many cities an towns install parking meters and signs on posts mounted in sidewalks, concrete median strips and the like. The posts supporting the meters or signs will typically have a ground anchor driven below the depth of the concrete, and the post will telescope into or onto the anchor. When such posts are impacted by an errant motorist, snow plow, or other moving vehicle, the vehicle will be damaged if the post is fixed to the anchor. In addition, the post and/or anchor are frequently damaged, as well as the concrete surrounding the ground anchor. Even when some form of breakaway coupling is used, so that the post breaks away from the anchor on impact, there will typically be either a length of ground post or coupler left exposed above ground, or there will be a hole left in the sidewalk which can pose a hazard to pedestrians. A hole left in a sidewalk is often a magnet for women who wear high heels, for the elderly and infirm, for small children, and for the inattentive pedestrian. Damage to such posts can result in expensive repairs to or replacement of the post, expensive repairs to the surrounding pavement, exposure to potential lawsuits for property damage and personal injuries resulting from hazardous conditions resulting from a damaged post until repair and replacement, and other adverse economic and social costs.

A further problem with existing breakaway post couplers is that many existing couplers are not designed to shear with equal facility depending upon the angle of incidence of the impact. Many couplers only break cleanly when a sign or meter is struck head on, and require considerably more force to shear when struck obliquely, if they shear at all under such conditions.

It is therefore desirable to have a post coupler which mounts so that the shear point is flush with the ground, leaving no portion of the post projecting above ground after fracture, and which shears without leaving an unfilled hole upon fracture. It would further be desirable to have such a post coupler which is easy to install, and which will leave the ground anchor and surrounding pavement undamaged on fracture. Several patents have been directed to breakaway post couplers, but none display all of the structure and resulting advantages featured by the present invention.

U.S. Pat. No. 3,628,296, issued Dec. 21, 1971 to H. J. Henry, shows a breakaway sign post with three sections, one a ground anchor, the second a reinforcing section telescoping around the ground anchor, and the third a post which telescopes into the ground anchor. All three sections are tubular, polygonal, and perforated so that the post breaks due to the weakened cross section caused by the perforations. This post suffers from the disadvantage of not being able to break cleanly at all impact angles due to the polygonal shape, as well as breaking at multiple points due to the perforated structure. U.S. Pat. No. 5,535,555, issued Jul. 16, 1996 to Boyd et al., shows another coupling device which uses holes or apertures to define a shear point.

U.S. Pat. No. 4,850,565, issued Jul. 25, 1989 to A. M. Moreno, shows a ground post with a U-shaped channel at the top of the post with a first cylindrical member welded inside the channel, a U-shaped channel having a second cylindrical member welded to the inside of the channel, and a shear pin extending through aligned bores in the first and second cylindrical members. U.S. Pat. No. 5,004,366, issued Apr. 2, 1991 to G. H. Simmons, and U.S. Pat. No. 5,855,443, issued Jan. 5, 1999 to Faller et al., also show couplers which utilize shear bolts.

U.S. Pat. No. 4,638,608, issued Jan. 27, 1987 to W. H. Coy, U.S. Pat. No. 4,926,592, issued May 22, 1990 to C. O. Nehls, U.S. Pat. No. 5,782,040, issued Jul. 21, 1998 to D. McCartan, and U.S. Pat. Nos. 3,820,906 and 3,846,030, both issued to H. L. Katt on Jun. 28, 1974 and Nov. 5, 1974, respectively, all show breakaway couplers in which the shear point is mounted above ground.

U.S. Pat. No. 5,214,886, issued Jun. 1, 1993 to D. P. Hugron shows a breakaway coupler in which the sign post and ground post are not completely severed. U.S. Pat. No. 5,425,593, issued Jun. 20, 1995 to R. J. Buehler, shows a sleeve with upper and lower receptacles with receive the sign post and ground post, respectively. U.S. Pat. No. 5,480,121, issued Jan. 2, 1996 to Rice, et al., describes a breakaway connector having two U-shaped sections bolted to the sign post and the ground post, the U-shaped sections being joined by a hollow stud welded to the web of each connector. The hollow stud has an annular groove about its center and two aligned bores extending transversely through the groove.

My own prior U.S. patent application, Ser. No. 09/238,057 filed Jan. 27, 1999, now issued as U.S. Pat. No. 6,113,055 on Sep. 5, 2000, shows a sign post coupler with a sign post socket and a shear section identical to those of the present invention. The present invention differs from the sign post coupler described in my prior application in that the coupler of the prior application has a ground post socket for receiving a ground post, whereas the present invention uses a wedge to secure the coupler to a ground anchor which is embedded in concrete, and the shear section is at least partially filled after rupture by a bolt head.

None of the above inventions and patents, taken either singularly or in combination, is seen to describe the instant invention as claimed. Thus a flush mount breakaway post coupler solving the aforementioned problems is desired.

SUMMARY OF THE INVENTION

The flush mount breakaway post coupler is a coupler for connecting a post to a ground anchor. The coupler has an upper section and a lower section. The upper section has a socket for receiving a post, a shear section, and an anchor attachment portion for attachment to the lower section. The shear section is hollow and cylindrical and has an groove defined about its exterior so that the wall of the shear section is thin, fracture of the coupler occurring around the annular groove. The lower section is an expansion anchor having a threaded bore for receiving a bolt, the lower section being placed in a tubular ground anchor, or a hole defined in the ground. The socket has a bottom wall, and a cylindrical bore extends through the shear section to a predetermined base in the anchor attachment portion. A bolt hole extends from the base of the bore through the anchor attachment section. A bolt connects the upper and lower sections so that the coupler is wedged into the tubular ground anchor as the bolt is tightened. The coupler is installed with the shear section coplanar with ground level. When the coupler fractures, the socket breaks off, leaving no portion of the coupler above ground, and the remaining annular edge of the shear section and the top surface of the bolt head level with the surface of the ground.

Accordingly, it is a principal object of the invention to provide a flush mount breakaway post coupler for supporting a parking meter, sign post, fence post, and the like with a shear section installed at ground level so that the coupler breaks at the shear section when the post is impacted by a force, such as a motor vehicle collision with the post, leaving substantially no portion of the ground anchor or post exposed above ground.

It is another object of the invention to provide a breakaway post coupler which leaves a portion of the coupler substantially coplanar with the surface of the ground after shearing so that an unfilled hole is not left exposed after the post has broken away.

It is a further object of the invention to reduce the economic costs to municipalities of repairing and/or replacing posts and the pavement surrounding post installations resulting from damage to is sign posts and parking meters.

Still another object of the invention is to reduce the risk of personal injuries and damage claims resulting from damaged post installations in municipal areas by providing a breakaway post coupler with shear section flush mounted at ground level and which remains at least partially filled after the post is broken away.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
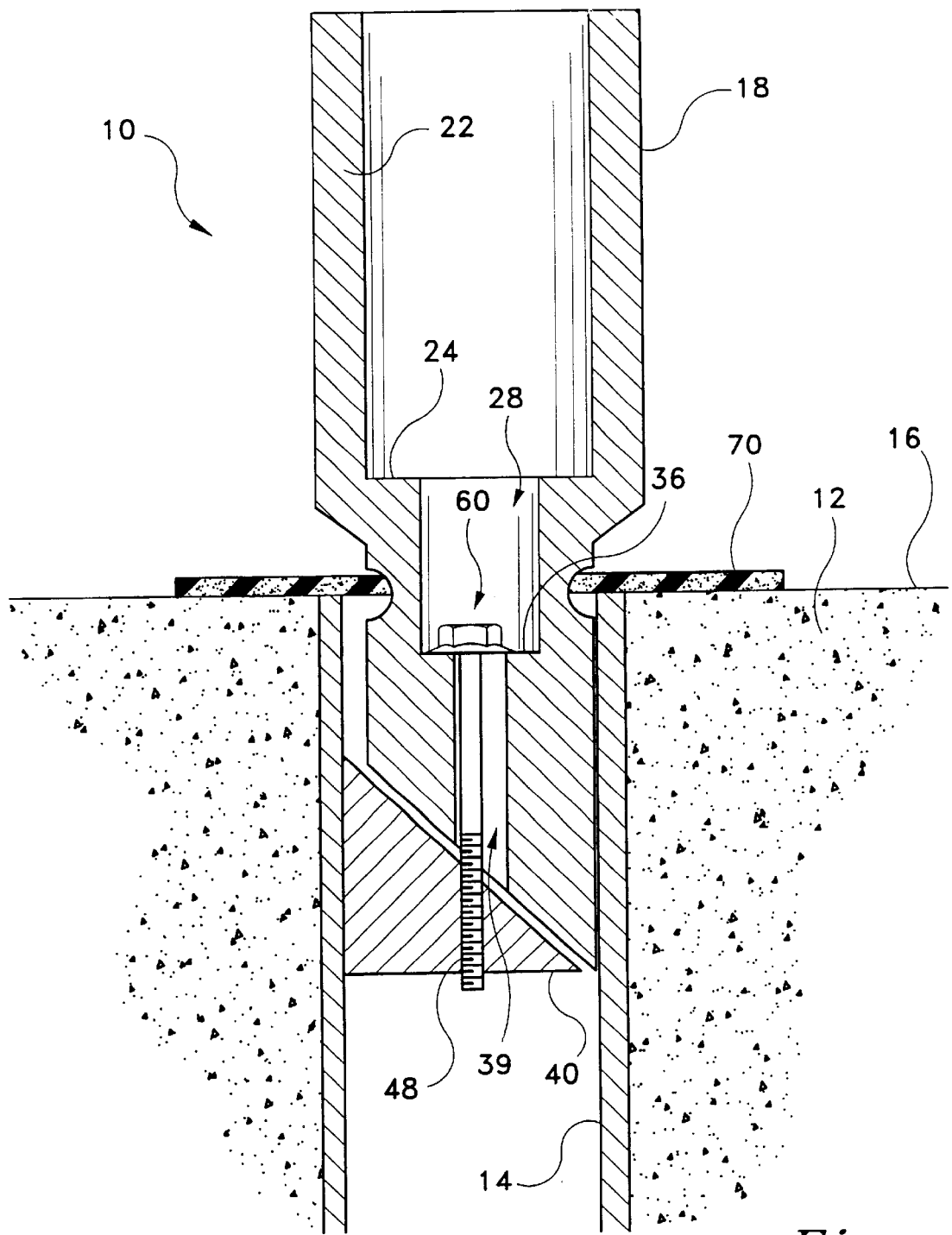
FIG. 1 is an environmental section view of a flush mount breakaway post coupler according to the present invention.

The present invention is a flush mount breakaway post coupler, designated generally as 10 in the drawings. The post coupler 10 is used for mounting posts, such as parking meter posts, sign posts, fence posts, etc., to a ground anchor, and particularly to a ground anchor which is embedded in concrete. The coupler 10 is of the breakaway type, so that the coupler 10 will break when the post is impacted by a force which exceeds a predetermined strength in order to minimize damage both to the post and to motor vehicles which impact the post. The coupler 10 is termed a "flush mount" coupler 10 to signify that the coupler 10 is designed with a shear section which is flush with the ground so that substantially no portion of the coupler 10 is left connected to the ground anchor above ground level.

FIG. 1 shows an environmental view of the coupler 10 in section, the post being omitted. The coupler 10 is designed for installation in sidewalks, median strips, and other locations which have a concrete 12, asphalt, or other surface. FIG. 1 shows how the coupler 10 may be retrofitted to an existing post installation. Such conventional installations will typically have a tube 14 imbedded in the concrete 12, the post being telescopically mounted on or in the tube 14. If the tube 14 extends above the surface 16 of the ground, the tube 14 is cut so that the top of the tube 14 is level with the surface 16 in order to install the coupler 10 of the present invention. The tube 14 may be circular, square or rectangular in cross section. If the coupler 10 is being installed at a new location so that there is no existing ground anchor tube 14, then either a tube 14 may be installed in the concrete 12, or the coupler 10 may be installed in a hole of the proper shape and dimensions drilled into the concrete 12 for mounting purposes.

Figure 2:
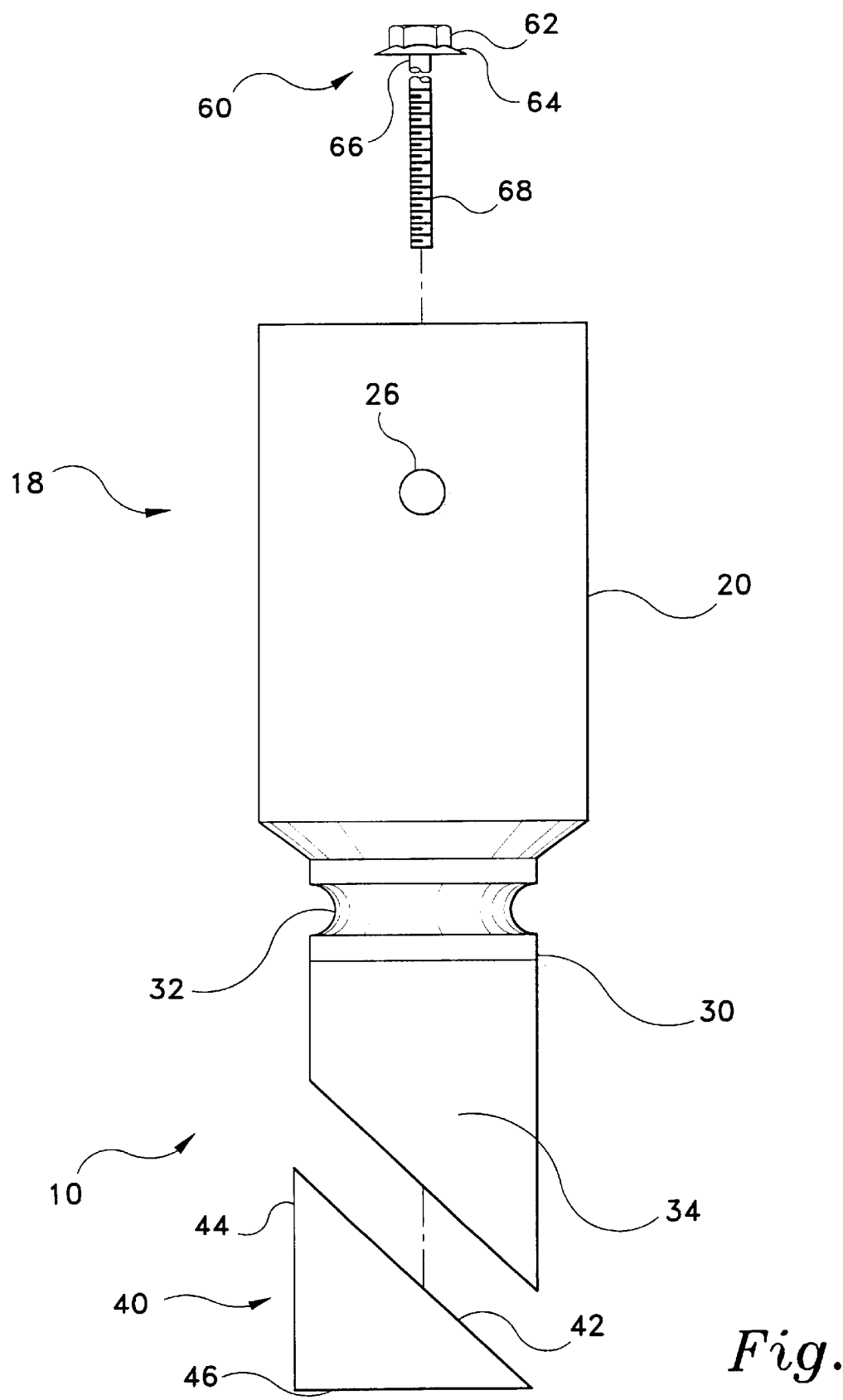
FIG. 2 is an exploded view of a flush mount breakaway post coupler according to the present invention.

The coupler 10 has an upper section 18 and a lower section 40 connected by a bolt 60. The upper section 18 includes a socket 20 for receiving a post, a shear section 30, and an anchor attachment portion 34. The socket 20 has a bottom wall 22 and at least one side wall 24 for supporting the post. The socket 20 may be hollow and cylindrical for supporting a cylindrical post, in which case the socket 20 has one continuous side wall 24, or it may be a hollow square tube for supporting a square post, or a hollow rectangular tube for supporting a post which is substantially U-shaped in section, in which cases the socket 20 has four sidewalls 24. Preferably the socket 20 is deep enough to support the post without any further means being necessary to fasten or clamp the post to the socket 20, the bottom wall supporting the post from below and the side wall(s) 24 supporting the sides of the lower end of the post. However, the side wall 24 may have a hole 26 (shown in FIG. 2) defined therein for receiving a bolt (not shown) or other means which may be used to secure the post to the coupler 10.

The socket 20 tapers downward and inward to join a shear section 30, which is cylindrical in shape. The shear section 30 has an annular groove 32 defined about its circumference. The groove 32 is approximately semicircular in shape, having a diameter from top to bottom about twice the depth of the groove 32. The shear section 30 has a cylindrical bore 28 defined therein which extends from the bottom wall 22 of the socket to an anchor attachment portion 34, so that the shear section 30 is hollow and has thin walls where the groove 32 is defined. The coupler 10 shears upon impact of the post by a predetermined force, the shear occurring in a horizontal or transverse plane which bisects the annular groove 32 normal to the cylindrical bore 28. The cylindrical shape of the shear section 30 and the annular groove 32 defined therein permit the shear section 30 to fracture and break cleanly for equal force loads, no matter what direction the post is struck from.

The shear section 30 merges into an anchor attachment portion 34. The top wall 36 of the anchor attachment portion 34 defines the base of the cylindrical bore 28. The bottom wall 38 of the anchor attachment portion 34 is sloped, the bottom wall 38 and one of the side walls of the anchor attachment portion defining a dihedral angle which is preferably between 30° and 60°. The side walls of the anchor attachment portion 34 are parallel, so that the other side wall and the bottom wall 38 define a supplementary angle between 120° and 150°. The body of the anchor attachment portion 34 may be in the shape of a cylindrical segment, a triangular prism, or any other shape joined to and integral with the cylindrical shear section 30 and adapted to slide into and closely approximate the walls of the tube 14 or hole defined in the concrete. The body of the anchor attachment portion 34 has a bore 39 defined therein which extends between the base 36 of the cylindrical bore 28 and the bottom wall 38. The bore 39 has a smaller diameter than the cylindrical bore 28 and houses a portion of the bolt 60 as described below.

The upper section 18 is formed in a single, one-piece unit by casting, forging, molding or other metal working processes conventionally known in the art. The upper section is preferably is made from 65-45-12 ductile iron, 65-45-12 representing the tensile strength in thousands of pounds per square inch, the yield strength in thousand of pounds per square inch, and the percent elongation, respectively. The ductility of the iron permits the coupler 10 to be elongated to an appreciable degree before rupture occurs. Hence, low speed impacts, such as wind, random efforts of vandals to break the coupler, and other forms of constant pressure applied to the post will result in failure of the post, and will bend the post rather than break the coupler 10. Alternatively, the upper section 18 may be made of aluminum 356-T6.

The lower section 40 is a body shaped to complement the configuration of the bottom wall 38 of the anchor attachment portion 34 of the upper section 18. The lower section may have the shape of a cylindrical segment, triangular prism, or any other shape which is sized and dimensioned to slide into and closely approximate the walls of the tube 14, or the hole defined in the concrete 12 if no tube 14 is used. The top wall 42 of the lower section 40 is sloped and forms dihedral angles with the side wall(s) 44, and in the case of a triangular prism shape, with the bottom wall 46 which are supplementary to the dihedral angles formed between the bottom wall 38 and side walls of the anchor attachment portion 34, so that the lower section 40 may be placed in abutting contact with the anchor attachment portion 34 with the entire surface of the bottom wall 38 in contact with the entire surface of the top wall 42 of the lower section 40. The lower section 40 has a threaded bore 48 defined therein extending between the top wall 42 and the bottom wall 46 for receiving the bolt 60.

The lower section 40 is made from the same material as the upper section 18. Preferably, the lower section 40 is made from 65-45-12 ductile iron, 65-45-12 representing the tensile strength in thousands of pounds per square inch, the yield strength in thousand of pounds per square inch, and the percent elongation, respectively. Alternatively, the lower section 40 may be made from aluminum 356-T6.

The bolt 60 is a flanged bolt having a hex head 62 with a circular flange 64 about the base of the head 62. The shaft 66 has an upper, unthreaded portion 66 and a lower threaded portion 68. The bolt 60 is inserted into the coupler 10 with the head 62 in the cylindrical bore 28 proximate the base 36, the shaft disposed in the bore 39 defined in the anchor attachment portion 34, and with the lower portion of the shaft 68 engaging the threaded bore 48 in the lower section 40. The diameter of the flange 64 is greater than the diameter of the bore 39 defined in the anchor attachment portion 34 so that the bolt head 62 does not fall through the bore 39. As an alternative to using a flanged bolt, the bolt 60 may be a plain hex head bolt used with a washer having a diameter greater than the diameter of the bore 39.

Figure 3:
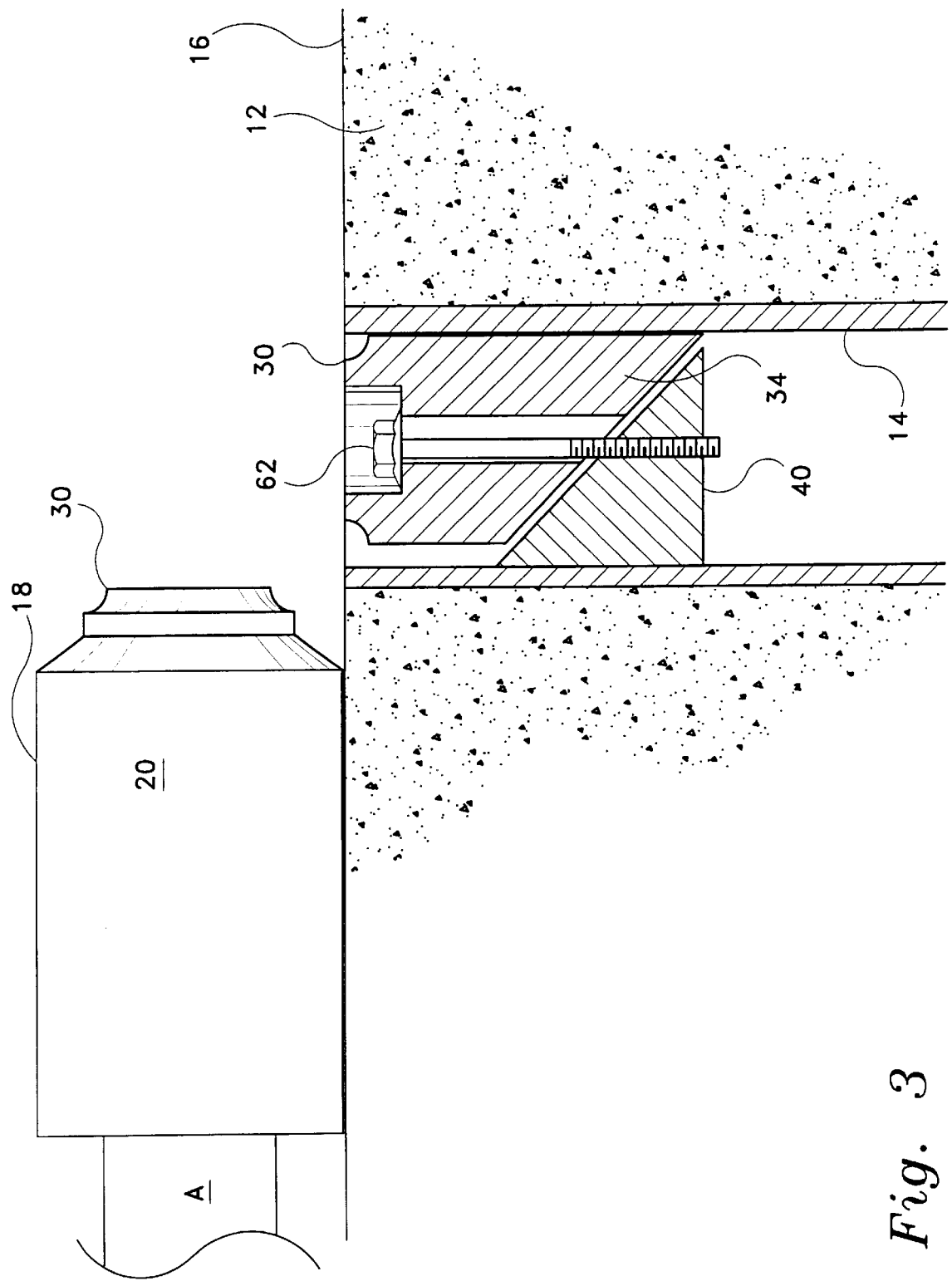
FIG. 3 is an environmental elevational view, partially in section, of a flush mount breakaway post coupler according to the present invention after the shear section is broken.

The diameter of the bore 39 is greater than the diameter of the threaded bore 48 in the lower section so that as the bolt 60 is tightened, the lower section 40 slides with relation to the bottom surface 38 of the anchor attachment portion 34, rising in the tube 14 and being offset from the anchor attachment portion 34 in order to anchor the coupler 10 in the tube 14 in wedge fashion, as shown in FIGS. 1 and 3. The amount of offset shown in the Figures is not drawn to scale and is somewhat exaggerated to illustrate operation of the coupler 10. The large diameter of the bore 39 permits the upper portion 66 of the shaft of the bolt 60 to be offset from the axial center of the bore 39 as the lower section 34 slidably rises along the bottom wall 38 of the anchor attachment portion 34.

Figure 4:
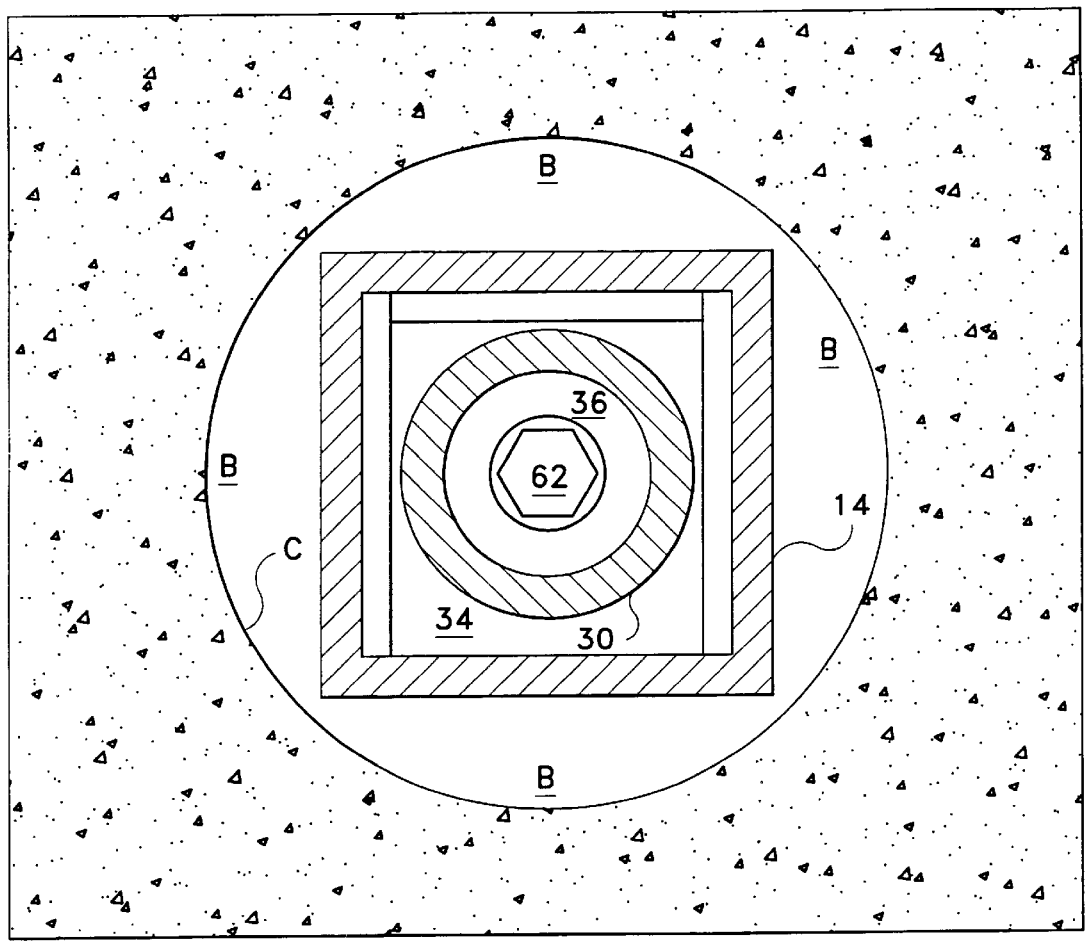
FIG. 4 is a top plan view of a flush mount breakaway post coupler according to the present invention after the shear section is broken.

The dimensions of the bolt 60 are selected so that the top surface of the hex head 62 is level or coplanar with the shear line through the shear section 30. FIG. 3 illustrates the configuration of the coupler 10 after the post A has been impacted by a motor vehicle and the coupler 10 has fractured along the shear line. As shown in the drawing, the upper section 18 has broken away along the shear section 30 so that the socket 20 is completely separated from the anchor attachment portion 34. The portion of the wall of the shear section 30 remaining attached to the anchor attachment portion 34 and the top surface of the bolt head 62 are substantially coplanar with the surface 16 of the concrete at ground level. FIG. 4 shows a plan view of the portion of the coupler 10 remaining in the ground after the coupler 10 is broken. The remaining portion of the shear section 30 and the bolt head 62 substantially fill the area inside the tube 14 at ground level, leaving only a small annular groove between the bolt head 62 and the shear section 30 and the narrow area between the shear section 30 and the walls of the tube 14 as unfilled holes. The areas B located between the exterior of the tube and the circle C marking the hole drilled in the concrete for installation of the post are normally filled with dirt, gravel, concrete, or other filler material. Consequently, the coupler 10 of the present invention leaves very little in the way of a hole after fracture for pedestrians to trip over.

The coupler 10 is furnished with an installation seal 70, shown in FIG. 1. The installation seal 70 is an annular disk made from foam rubber which serves as a depth control guide during installation of the coupler 10. The inner diameter of the seal 70 is elastic so that the seal 70 may be placed on the coupler 10 elastically engaging the annular groove 32 defined in the shear section 30. During installation of the coupler 10, the anchor engagement portion 34 is placed in the tube 14, the lower section 40 being loosely attached to the upper section 18 by bolt 60, until the lower surface of the seal 70 is flush with the top surface 16 of the concrete. The bolt 60 is then tightened, access to the bolt head 62 being through the socket 20 and cylindrical bore 28, until the coupler 10 is wedged into the tube 14, or hole C in the concrete if no tube 14 is used. The seal 70 may then be removed by cutting the seal 70 with a knife, or it may be left in place to cover the installation and seal out moisture.

Figure 5:
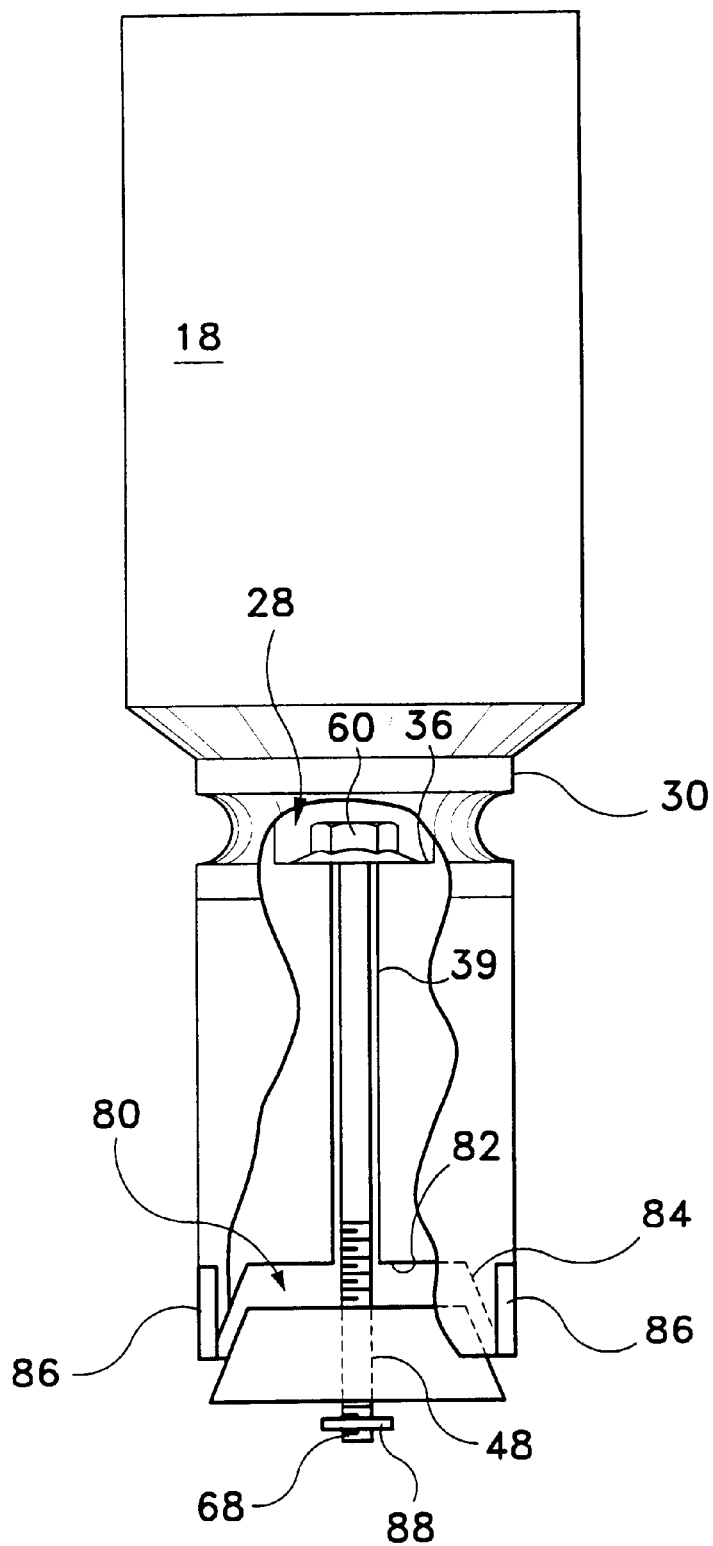
FIG. 5 is an elevational view of an alternative embodiment of a flush mount breakaway post coupler according to the present invention.

FIG. 5 shows an alternative embodiment of a coupler according to the present invention which is particularly useful for installation in square or rectangular tubes 14. The coupler 10 shown in FIG. 5 has an upper section 18 and a lower section 40. The upper section 18 has a socket 20 and a shear section 30 which are identical to the embodiment shown in FIGS. 1–4. The anchor attachment portion 40 in this embodiment may be square, rectangular, or cylindrical in cross section. The anchor attachment portion 40 has a cavity 80 defined in its bottom wall 38. The cavity 80 is defined by a horizontal top wall 82 and sloping side walls 84, the cavity 80 having a trapezoidal shape in vertical section. A bore 39 is defined axially in the anchor attachment portion 40 which extends from the base 36 of cylindrical bore 28 to the top wall 82 of the cavity 80. The lower portion of the anchor attachment portion 34 has a plurality of slots 86 defined in the side walls 84 of the cavity 80.

The lower portion 40 is a body having a shape complementary to the cavity 80, but dimension slightly larger than the opening defined by the cavity 80. The lower portion 40 is also trapezoidal in vertical section. The lower portion 40 has a threaded bore 48 defined therein which engages the threaded portion 66 of bolt 60. The bolt 60 may have a C-clip 88 or retainer ring about a portion of the lower shaft 68 so that as bolt 60 is tightened, the clip 88 raises the lower portion 40 to fill the cavity 80, the slots 86 permitting the lower portion of the anchor attachment portion 34 to expand outwardly to wedge the coupler 10 into the tube 14 or a hole defined in the concrete 12. Alternatively, the bore 39 may be threaded and the lower end 68 of the shaft of bolt 60 may be rotatably embedded in the body of the lower section 40, either arrangement being designed to permit the lower section 40 to be raised into the cavity 80 to expand the anchor attachment portion 34 to wedge or anchor the coupler 10 into the ground. The anchor attachment portion 34 of the coupler 10 is closely toleranced to the tube 14 or hole C, so that expansion of only a few thousandths of a millimeter is necessary to anchor the coupler 10.

It is to be understood that the present invention is not limited to the embodiments described above, but encompasses any and all embodiments within the scope of the following claims.

I claim:

1. A flush mount breakaway post coupler for supporting a post, comprising:
   a) an upper section having:
      i) a socket having a bottom wall and at least one side wall, the socket being sized, dimensioned and configured for receiving a post;
      ii) a shear section, the shear section being cylindrical and having an annular groove defined about its exterior surface; and
      iii) an anchor attachment portion having a top wall and a bottom wall, the anchor attachment portion being dimensioned and configured for insertion into a ground anchor;
      iv) the shear section having a cylindrical bore extending from the bottom wall of said socket to the top wall of the anchor attachment portion, the top wall of the anchor attachment portion defining a base of the cylindrical bore;
      v) the anchor attachment portion having a bore defined therein extending from the base of said cylindrical bore to the bottom wall of the anchor attachment portion;
   b) a lower section having a top wall and a bottom wall, the lower section having a bore defined therein extending from the top wall to the bottom wall; and
   c) a bolt having a head and a threaded shaft, the bolt joining said lower section to said upper section, the bolt head being seated at the base of said cylindrical bore and having a top surface coplanar with said annular groove, the bolt being for raising said lower section in order to wedge said coupler in the ground anchor with said shear section when flushed with ground level, said shear section breaking at ground level when the post is struck with a force exceeding a predetermined level.

2. The flush mount breakaway post coupler according to claim 1, wherein said upper section and said lower section are made from ductile iron having a tensile strength of about sixty five thousand pounds per square inch, a yield strength of about forty-five thousand pounds per square inch, and a percent elongation of about twelve percent.

3. The flush mount breakaway post coupler according to claim 1, wherein said upper section and said lower section are made from aluminum 356-T6.

4. The flush mount breakaway post coupler according to claim 1, wherein:
   a) the bottom wall of the anchor attachment portion of said upper section and the top wall of said lower section are sloped at supplementary angles so that said lower portion is slidable with respect to said upper section; and
   b) the bore defined in said lower section is threaded, said the top wall of said lower section slidable up the bottom wall of the anchor attachment portion of said upper section in order to wedge said coupler in said ground anchor as said bolt is tightened in the bore defined in said lower section.

5. The flush mount breakaway post coupler according to claim 1, wherein:
   a) the bottom wall of the anchor attachment portion of said upper section has a cavity defined therein, the cavity having a top wall and having a trapezoidal shape in cross section;
   b) the anchor attachment portion has a plurality of slots defined therein extending from the bottom wall of the anchor attachment portion to the top wall of said cavity; and
   c) said lower section is trapezoidal in cross section, shaped complementary to said cavity, and dimensioned slightly larger than said cavity so that said lower section expands the anchor attachment portion of said upper section in order to wedge the coupler in a ground anchor when said bolt is tightened.

6. The flush mount breakaway post coupler according to claim 1, wherein said coupler is adapted for mounting in a hole defined in a concrete surface with said shear section flush with the concrete surface.

7. The flush mount breakaway post coupler according to claim 1, wherein said coupler is adapted for mounting in a tube embedded in a concrete surface with said shear section flush with the concrete surface.

8. The flush mount breakaway post coupler according to claim 1, further comprising a tube adapted for being imbedded in a concrete surface, said upper section and said lower section being inserted into said tube, the upper and lower sections being wedged into said tube when said bolt is tightened with the shear section level with the concrete surface.

9. The flush mount breakaway post coupler according to claim 1, further comprising an installation seal, the installation seal being a flat annular disk elastically engaging the annular groove defined in said shear section in order to define a depth to which the coupler is insertable in a ground anchor so that the head of said bolt is coplanar with ground level when said shear section is broken.

10. The flush mount breakaway post coupler according to claim 9, wherein said installation seal is made from foam rubber.

11. The flush mount breakaway post coupler according to claim 9, wherein said installation seal is made from a material which seals moisture out of the ground anchor.

12. The flush mount breakaway post coupler according to claim 1, wherein the head of said bolt includes a circular flange having a diameter greater than the diameter of the bore defined through the anchor attachment portion of said upper section.

\* \* \* \* \*